Nov. 30, 1943. A. O. PRICE 2,335,789
HIGH SPEED ROTOR APPARATUS
Filed Oct. 1, 1942 2 Sheets-Sheet 1

INVENTOR.
Albert O. Price,
BY Sawell & Wesseler,
ATTORNEYS.

Nov. 30, 1943.    A. O. PRICE    2,335,789
HIGH SPEED ROTOR APPARATUS
Filed Oct. 1, 1942    2 Sheets-Sheet 2

INVENTOR.
Albert O. Price,
BY Saywell & Wesseler,
ATTORNEYS.

Patented Nov. 30, 1943

2,335,789

UNITED STATES PATENT OFFICE 2,335,789

HIGH-SPEED ROTOR APPARATUS

Albert O. Price, Leesville, Ohio, assignor of one-third to James L. Meikle and one-third to William J. Wesseler, both of Cleveland, Ohio Application October 1, 1942, Serial No. 460,407

19 Claims. (Cl. 230—113)

This invention, as indicated, relates to a high speed rotor apparatus. More particularly, it comprises an apparatus having a liquid chamber wherein a rotor element formed with one or more blades suitably shaped for proper fluid reaction and projecting a short distance from the body of the rotor shaft when operating at high speed produces fluid flow through passageways associated with each respective blade. The invention also permits the production of the rotor unit on a quantity production basis without sacrificing strength or precision of manufacture, or the efficiency of operation of the apparatus.

The invention is not confined to one particular form of apparatus, and the rotor may be the driving or driven element in different embodiments of the invention. The invention is particularly adaptable for use in pumping operations and may be utilized to create low pressure or high pressure, or to provide low pressure in the intake side and high pressure in the output side when a closed rotor chamber is used and suitable conduits or passageways provided. The rotor blades may be provided on a shaft held horizontally within a liquid chamber for high speed rotation and the blades may be positioned within separate chambers operating as single blade units or as multiple blade units, and each separate chamber may be provided with an independent intake and discharge line which may communicate with the respective manifold supplying a series of intake and discharge lines. The apparatus may also be operated on a horizontal shaft within a rotor chamber wherein a series of radially positioned blades placed in one or more transverse planes, or extending along one or more diagonal lines around the rotor shaft may be utilized, the spacing of the blades preferably being sufficient to insure full individual action of each blade member.

The rotor unit, in place of operating with the shaft in horizontal position, may be positioned to operate with the shaft in a vertical position, or at any angle which may be required for certain special uses.

The rotor unit may also be constructed as a separate piece of apparatus so that it may be immersed in natural bodies of water or in reservoirs for the purpose of pumping gases or liquids into the same. It likewise may be equipped with the pressure chamber so that it will be adapted to pump liquids from such reservoirs to suitable points of discharge. The unit also may be constructed for propulsive effects wherein fluid is drawn in from one area of the vehicle to be propelled and discharged adjacent another area thereof. It likewise may have a closed circuit wherein fluid transmission may be carried out through suitable propeller units, such as propeller wheel drive and the like. It is not intended to exclude any field of operation in which fluid pressure may be satisfactorily applied.

As has been indicated, the apparatus has a very high capacity due to its high speed of rotation, which in accordance with the number and shape of the blades may vary from speeds of approximately 2,000 revolutions per minute to five times such amount, or even more, consistent with the strength and size of materials used and the special uses to which the apparatus is to be put. It has been found that the apparatus is particularly suited to the production of low pressure effects which may be maintained over indefinite periods of operation without producing excessive wear on any of the operative parts. When the rotor is positioned within a closed chamber high pressure effects may be produced in the discharge line and a suitable working balance of high and low pressure effects can be provided for various types of operations through the use of a single apparatus. Through the retention of some residual pressure in the rotor chamber it is found, under certain conditions, that a better liquid seal can be obtained over the rotor discharge ports and improved operation attained in such manner. It is important that the chamber utilized be rectangular, or one having features providing adequate baffles to prevent the formation of eddy currents within the liquid chamber which would reduce the efficiency of the rotor blade.

When the apparatus is used as a pump it may be employed in widely divergent fields, such as are at present supplied in different types of air and gas pumps, as well as other pumps for fluid pumping, dispensing, power transmission and mixing operations of highly specialized construction.

When used in pumping liquids carrying suspended material having an abrasive effect it operates with a smaller degree of destructive wear than is present where valve or gear type pumps are used making direct frictional contact with the abrasive particles. It is also of value where chemicals and liquids having corrosive action are to be handled in view of the fact that a single rotor element may be employed which is resistant to destruction by such liquids being handled, and thus an apparatus thoroughly dependable and of long service life can be provided in fields where the expense of replacement would be a large factor in the cost of production.

It is impossible to outline all the uses to which the apparatus can be put since it can operate to advantage not only in the conventional line of pumping equipment, but in a large number of allied lines of pumping transmission and power development of both a general and highly specialized character.

The principal object of the present invention is to provide a rotor unit having one or more blade elements adapted to be rotated at high speed to develop low pressure effects adjacent the openings through such blades whereby fluid flow through the suction effects will be caused through passageways associated therewith.

Another object of the invention is to provide a high speed rotor unit adapted to be revolved in a liquid chamber, such rotor unit having hollow blades and being shaped to produce a high rate of fluid flow through passageways in said blades to an area of low pressure adjacent the discharge ports of said blades.

Another object of the invention is to provide a rotor in the form of a hollow shaft provided with one or more discharge ports about its periphery in the form of projecting elements of slight elevation and shaped to form areas of low pressure adjacent the rearward faces, and to discharge into such low pressure area fluids carried in passageways communicating with the discharge elements of said rotor.

Another object of the invention is to provide a hollow rotor unit formed with a plurality of blades or low pressure inducing elements formed on the surface thereof and having fluid supply ports adjacent thereto and means for driving said rotor at high speed to produce a high rate of fluid flow through the rotor ports and into such chamber.

Another object of the invention is to provide a unit of the type described in the preceding paragraph wherein the chamber is provided with an air or gas cushion and means to control the rate of discharge from the chamber whereby the apparatus may be used as a pressure pump for various types of fluids, including gases and liquids of different compositions or mixtures thereof.

Another object of the invention is to provide a high speed rotor pump of the character described in the preceding paragraphs which is adapted to handle live steam free of the disadvantages of many types of pumps wherein high pressure losses cannot be avoided.

Another object of the invention is to provide a pumping unit of the character set forth in the preceding paragraphs wherein the apparatus is adapted to be used for cooling, heating, emulsifying or purifying various types of liquids carrying solid or suspended matter.

Another object of the invention is to provide a rotor unit formed with multiple discharge ports driven from a common power source and each unit acting independently to produce suction and pressure effects which may be selectively combined externally of such unit in amounts necessary for various types of operations.

Another object of the invention is to provide a rotor unit of the type set forth in the preceding paragraphs mounted in the chamber with elements serving to prevent vortex formation or fluid action which would reduce the effectiveness of the fluid seal from the discharge ports of the unit.

Another object of the invention is to provide an apparatus of the character set forth in the above paragraphs wherein an increased pressure is provided within a rotor chamber with means for utilizing such high pressure effects.

Another object of the invention is to provide a high speed rotor adapted to form areas of agitation within a chamber in order to bring about washing, purifying or material treating effects upon the contents of such chamber.

Another object of the invention is to provide high speed apparatus embodying the principles of the invention to produce rapid fluid flow at points where it is desired to prevent accumulation of sediment.

Another object of the invention is to provide a high speed rotor unit having a multiple series of discharge blades communicating with a passageway within the rotor shaft with the series of blades of predetermined shape and position to produce satisfactory combined operation without interference from companion blade units.

Another object of the invention is to provide a simple structure for the rotor unit of the apparatus by forming the blade element in a flat sheet in whole or in part, and then forming the sheet into a tubular member to fit upon the hollow rotor shaft.

Other and further objects of the invention will appear in the course of the following description.

To the accomplishment of the foregoing and related ends, said invention, then, consists of the means hereinafter fully described and particularly pointed out in the claims, the annexed drawings and the following description setting forth in detail certain means embodying the invention, such disclosed means constituting, however, but several of various forms in which the principle of the invention may be used.

Figure 2:
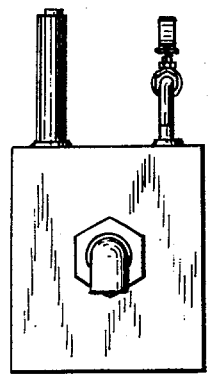
Fig. 2 is a side elevation of the structure shown in Figure 1 as seen from the left-hand side.
Figure 1:
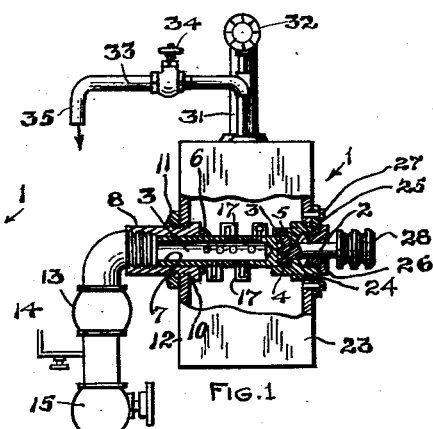
Fig. 1 is an end elevation, partly in section, of an apparatus embodying the principles of the invention showing one particular type of rotor unit therein.
Figure 3:
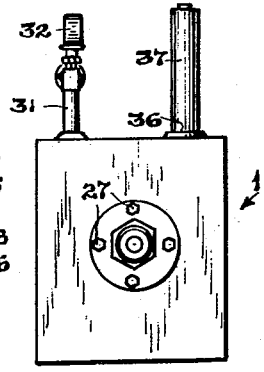
Fig. 3 is a side elevation of the structure shown in Figure 1 as seen from the right-hand side.
Figure 4:
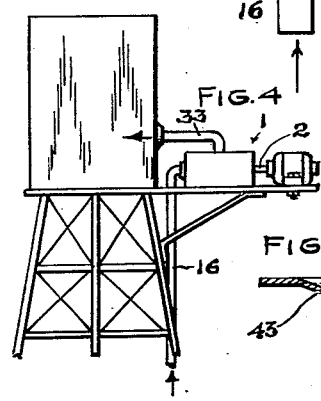
Fig. 4 is a side elevation showing a water tank with a pump unit embodying the principles of the invention associated therewith.

As is clearly shown in Figure 1 the pump unit proper may be in the form of a rectangular casing or chamber 1, preferably having greater height and length than width, and having a shaft extending centrally across the width thereof, such shaft comprising a driving portion 2 with a rotor portion 3 interlockingly engaged therewith by means of lugs 4 engaging within slots 5. The rotor is formed with a flange 6 spaced from the end thereof opposite the slots, and the free end 7 engages within the terminal member 8 on the inlet pipe 9 which terminal has an inner flange 10 and a body portion which extends through the rear wall 12 of the casing 1, being externally threaded and held by a clamping ring 11. The inlet pipe may be supplied with a check-valve 13 and outwardly thereof may have connection with a small diameter tube 14 leading to a manometer (not shown).

A cut-off valve 15 is provided outwardly of the manometer connecting tube 14, and the lower end 16 of the inlet pipe may be turned at a downward angle so as to be immersed in a tank of water or other liquid from which the pump is to draw its liquid supply, but may have any desired fluid supply connection.

Figure 9:
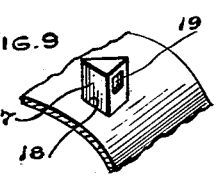
Figures 9, 10 and 11 are diagrammatic perspective views, partly in section, showing different types of blade members mounted on a hollow rotor shaft.
Figure 10:
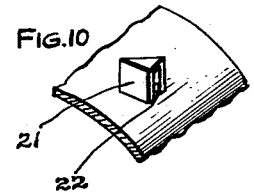

The active pumping elements or blades 17 of the rotor may take various forms and be mounted around the rotor shaft or body in a variety of different positions. As shown in Figure 9 the blade member 17 is fitted within a triangular opening 18 in the rotor shaft and is closed at all sides excepting for a small port or discharge opening 19. The blade unit 21, as shown in Figure 10, is also of triangular form, but is of substantially one-half the height of the rotor shown in Figure 9 and has the entire rearward wall omitted so as to provide a discharge port 22 of larger area than the discharge port shown in the blade in Figure 9.

It will be noted that the drive shaft 2 for the rotor is reduced in diameter as it extends through the side wall 23 of the pump chamber, and that a packing gland 24 of conventional design is supplied at such point and is provided with a packing 25 held firmly against the circumference of the shaft so as to prevent leakage of liquid through the bearing 26.

Securing bolts 27 may be provided to hold the packing gland firmly in adjusted position. Through the removal of the packing gland assembly the entire rotor unit may be withdrawn. This permits inspection, cleaning and replacement, if necessary. Other types of rotors may be substituted if required. At the outer end of the shaft 2 a pulley 28 of suitable size is provided, preferably one having a plurality of V-grooves to receive a plurality of drive belts in non-slipping engagement.

The discharge line of the pump is connected with the top wall thereof in the form of an upright pipe 31 which may have a pressure gauge 32 at its upper end and a discharge pipe 33 connected thereto, such discharge pipe having a shut-off valve 34 and a discharge end 35 to which a suitable connection may be made. When the discharge valve 34 is closed and the inlet valve 15 is opened the gauge 32 will show a high degree of pressure.

It should be mentioned that the blade size must be kept below a ratio which would involve heavy power costs to drive the unit. The speed of the unit should be maintained at a point where destructive action on the bearings of the unit will not occur, but for emergency use a pump of this character can be provided with speed and internal pressure controls providing excess capacity should it be required for the fighting of fires or for heavy duty service at short intervals. It will be noted that the top wall of the pump casing is provided with an opening 36 within which a cylindrical air dome 37 is engaged, such air dome serving to receive a volume of pressure air sufficient in quantity to maintain even flow of the discharge line and to keep the rotor chamber substantially full of liquid in order that the sealing area around each discharge port in the rotor will be of sufficient density to prevent interference therewith by low pressure areas caused by companion rotor blades.

Figures 13, 16:
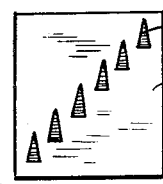
Figures 13, 14 and 15 are transverse sectional views showing rotor shafts having different blade arrangements about the circumference thereof.
Figures 16, 17 and 18 are flat projections of the cylindrical surfaces of the rotors shown in Figures 13, 14 and 15, respectively.
Figures 14, 17:
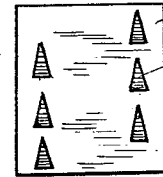
Figures 15, 18:
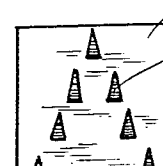
Figure 11:
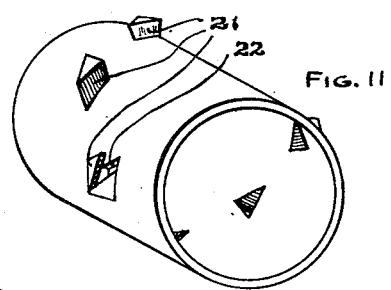
Figure 12:
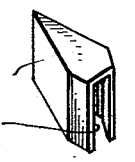
Fig. 12 is a perspective view of a still further modified form of blade member preliminarily to its being secured at its base to a hollow rotor shaft.

In the model illustrated six blades of approximately one inch height and of the general shape shown in Figure 9 with a quarter inch square opening adjacent the free end of each blade were provided, the blades being distributed on a diagonal line, as shown in Figure 11, with the several blades uniformly distributed around the circumference. The rotor so equipped, at a speed of 2400 revolutions per minute, pumped at the rate of thirty gallons per minute, and the manometer reading was in excess of twenty-eight inches. The manometer reading at the point named could be taken immediately upon shutting down the shut-off valve 15 and required no gradual building up of the suction to the amount named, but was apparently practically instantaneous in action. The arrangement of blades as shown in Figures 13 and 16 prevents the formation of vortices and provides a smooth-running pumping unit for different sized chambers and for variations in the performance of the pumping unit. The arrangement shown in Figures 14 and 17 may be found desirable inasmuch as the blades are arranged in two distinct lines spaced from each other, and the individual blades in each line are staggered with reference to each other. In the event vortices are formed in the rotor shown in Figures 14 and 17 it may be more desirable to place ribs on the inner walls of the pump chamber to prevent movement of the water within the chamber in a manner to interfere with the proper sealing of the discharge ports in the rotor. In order to provide a divided fluid flow within the pump chamber it may be found desirable to place the blade units in inverted V-formation around the shaft of the rotor in the manner shown in Figures 15 and 18. When so arranged the body of the liquid within the pump chamber will be thrown against the side walls thereof and will assume a position around each of the blades of such character as to afford a sealing area for each discharge port free of interference from the discharge ports of companion blades. This insures smooth running of the pump and high volume of output.

Figure 5:
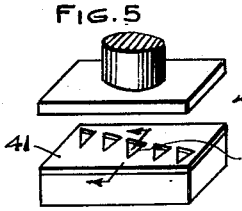
Fig. 5 is a diagrammatic perspective view showing the method of forming rotor blades in a flat plate.
Figure 7:
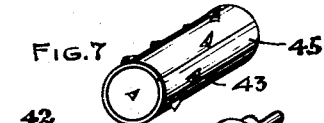
Fig. 7 is a perspective view of the plate shown in Figure 5 when rolled into cylindrical form to provide a rotor sleeve.
Figure 8:
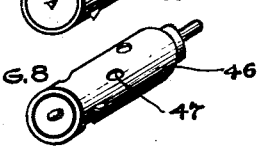
Fig. 8 is a perspective view of the driving section of a rotor member provided with apertures to register with the rotor blades of the sleeve shown in Figure 7 when the same are interengaged.
Figure 6:
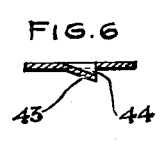
Fig. 6 is a fragmentary sectional view taken along the line 6—6 shown in Figure 5 looking in the direction of the arrows and showing one of the blade members as formed in the flat plate.

The method of forming the blades may be that shown diagrammatically in Figure 5 wherein a sheet metal plate 41 is formed between the members of a press 42 so as to force metal outwardly to provide two-walled blades 43 each having a triangular discharge aperture 44 at their rearward face. The dies of the press may be shaped to provide various outlines of blades, differing from those shown and in various positions on the plate. After the blades are formed the plate 41 is rolled into a cylindrical sleeve 45, as shown in Figure 7. In order to permit a number of plates to be selectively installed on a single rotor shaft the shaft 46 as shown in Figure 8 is preferably provided with a plurality of drilled holes 47 at suitable points to come into registry with blades positioned on the cylindrical sleeve 45 which is closely fitted thereover securely held by the terminal members on the rotor shaft.

Figures 19, 20, 21:
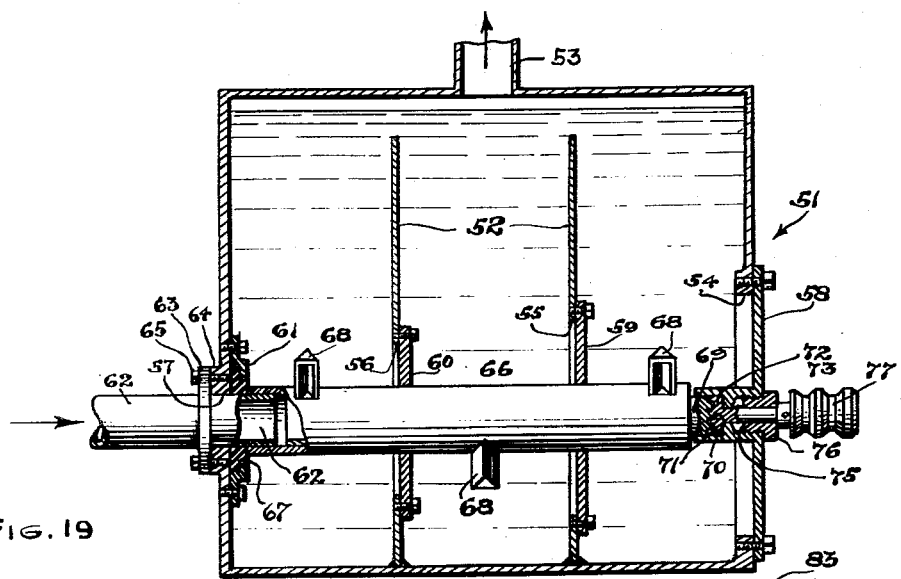
Fig. 19 is a central vertical sectional view of a multiple blade apparatus embodying the principles of the invention adapted for general use and especially for air or gas pumping.
Fig. 20 is a central vertical sectional view showing a pumping unit built up of a series of individual sections operating in pairs as independent pump units.
Fig. 21 is a top plan view of the structure shown in Figure 20.

In order to provide for high suction effects in air pumping, with large volume, it is desirable to provide individual chambers for the rotor elements, as shown in Figure 19. The chamber 51 is provided with internal partitions 52 spaced from the top to permit maintenance of the liquid level, and also to allow the air or gas passing through the pump to reach the central outlet 53. The end walls and partitions are provided with a series of openings 54, 55, 56 and 57, which may be of progressively decreasing size for convenience in attaching the closure plates, 58, 59, 60 and 61, secured in fluid-tight relation to the respective wall areas by suitable gaskets and bolts. The closure plate 61 provides a seal for the inlet pipe 62 which is held by a flange 63 against an enlargement 64 on the adjacent end wall of the chamber 51 by means of bolts 65. The free end 62 of the inlet pipe projects into the chamber and provides a bearing for the hollow rotor shaft 66, which at its extreme end bears against a sealing member 67 held within a recess in the closure plate 61. Fluid pressure forces the rotor axially into sealing relation and this sealing pressure increases with the degree of pressure built up in the closed chamber.

The rotor carries the closure plates 59 and 60 intermediate the rotor blades 68, and at its driving end is provided with a terminal 69 of reduced size provided with ribs and recesses 70, 71, adapted to interengage with complementary ribs and recesses on the enlarged end 72 of drive shaft section of the rotor, the reduced portion 73 of which engages through the bearing elements of the packing gland 74 formed as part of the closure plate 58. Suitable packing 75 is held in position by the bearing nut 76. A suitable pulley 77 is mounted on the free end of the shaft.

In order to provide a variety of pump sizes for different types of work without constructing larger chambers and rotors, the structure shown in Figures 20 and 21 may be used. It will be noted that two units 81 and 82 of substantially identical construction are provided, each being adapted to form part of a line of similar units to be operated from a single power source and, if desired, to receive and deliver fluid under high or low pressure, through a pair of manifolds, shown in Figures 20 and 21, as the inlet manifold 83 and the discharge manifold 84. Each unit is shown as having an air chamber, or receiving chamber 85 and a pumping chamber 86, each communicating with its respective manifold through the branch passageways 87 and 88. The sizes of the respective chambers may be varied in accordance with the character of fluid handled and the uses to which it is to be put. Each unit has a rotor shaft section 89, having at least one rotor blade 90 in the pumping chamber and having at least one inlet port 91 in the receiving chamber. The ends of the hollow rotor shaft are closed to provide a polygonal socket 92 at one end and a polygonal driving terminal 93 of a size to engage such recess in a companion rotor shaft, at the opposite end. Each unit has a pair of packing gland bearings 94, 95, for the shaft at each side of the receiving chamber. The outer wall of the pumping chamber 86 is provided with a large opening 96 around which the wall has a marginal recess 97. Where the unit is at one end of the line an end bearing plate 98 is secured in the recess 97 with suitable sealing elements 99, 100. The plate 98 carries the bearing socket 101 for the free end of the rotor shaft. A check valve 102 may be positioned between said blade 90 and inlet port 91.

Intermediate units will be held in clamped relation by clamping bars 103 of suitable length, and through the engagement of the polygonal terminals with the recesses a full operative line is established. The openings in the pumping chamber 86 of all units excepting that at the end of the line is sealed against the air chamber wall of the adjacent unit by means of a suitable gasket 104. The final unit at the other end of the line has a pulley 105 mounted on the polygonal terminal at that end.

As has been indicated pumps constructed and tested by applicant and under applicant's direction have shown high efficiency, and also especial adaptability for numerous uses where pumps of conventional construction are not satisfactory. Through variation in blade sizes and shapes as well as sizes of the input and output passageways a wide range of performance can be provided at very low cost of production and maintenance.

Other modes of applying the principle of my invention may be employed instead of those explained, change being made as regards the mechanism herein disclosed, provided the means stated by any of the following claims or the equivalent of such stated means be employed.

I therefore particularly point out and distinctly claim as my invention:

1. An apparatus of the character described having in combination a rotor unit immersed in a liquid bath adapted to produce fluid flow when operated at high speed, in a fluid chamber with walls spaced a substantial distance from said rotor unit, said rotor unit having a hollow shaft journalled at its open end upon a source of fluid supply and providing a liquid-tight joint under differential fluid pressure, and at least one rotor blade member projecting a short distance above said shaft open adjacent its rearward face, and having its forward portion shaped to produce an area of low pressure adjacent its said rearward face to cause movement of the fluid through said rotor and blade.

2. An apparatus of the character described having in combination a rotor unit immersed in a liquid bath adapted to produce fluid flow when operated at high speed, in a fluid chamber with walls spaced a substantial distance from said rotor uniit, said rotor unit having a hollow shaft journalled at its open end upon a source of fluid supply and providing a liquid-tight joint under differential fluid pressure, and a series of rotor blade members extending circumferentially around the same at spaced intervals each open adjacent its rearward face and each having its forward portion shaped to produce an area of low pressure adjacent its rearward face to cause movement of the fluid through said rotor and blade.

3. An apparatus of the character described having in combination a rotor unit immersed in a liquid bath adapted to produce fluid flow when operated in a liquid bath at high speed, in a fluid chamber with walls spaced a substantial distance from said rotor unit, said rotor unit having a hollow shaft journalled at its open end upon a source of fluid supply and providing a liquid-tight joint under differential fluid pressure, and a series of rotor blade members each projecting a short distance above said shaft, each blade being open adjacent its rearward face and each blade having its forward portion shaped to produce an area of low pressure adjacent said rearward face to cause movement of the fluid through said rotor and blades.

4. An apparatus of the character described having in combination a rotor unit immersed in a liquid bath adapted to produce fluid flow when operated at high speed, in a fluid chamber with walls spaced a substantial distance from said rotor unit, said rotor unit having a hollow shaft with a series of rotor blade members extending on at least one helical line circumferentially around the same at spaced intervals each open adjacent its rearward face and each having its forward portion shaped to produce an area of low pressure adjacent its rearward face to cause movement of the fluid through said rotor and blades.

5. An apparatus of the character described having in combination a rotor unit immersed in a liquid bath adapted to produce fluid flow when operated in a liquid bath at high speed, in a fluid chamber with walls spaced a substantial distance from said rotor unit, said rotor unit having a hollow shaft with at least one rotor blade member projecting a short distance above said shaft open at its upper rearward face, and having its forward portion shaped to produce an area of low pressure adjacent its said rearward face to cause movement of the fluid through said rotor and blade.

6. An apparatus of the character described having in combination a rotor unit immersed in a liquid bath adapted to produce fluid flow when operated at rotational speeds in excess of 2000 revolutions per minute, in a fluid chamber with walls spaced a substantial distance from said rotor unit having a hollow shaft with at least one rotor blade member projecting a short distance above said shaft open adjacent its rearward face, and having its forward portion shaped to produce an area of low pressure adjacent its said rearward face to cause movement of the fluid through said rotor and blade.

7. An apparatus of the character described having in combination a closed fluid chamber having inlet and outlet passageways connected therewith, a hollow rotor unit immersed in a liquid bath in said chamber associated in pressure sealed relation with said inlet passageway and adapted to receive fluid therefrom on a central axial line thereof, the walls of said chamber being spaced a substantial distance from said rotor unit at least one blade member mounted on said rotor and projecting slightly above the surface thereof, and having a discharge port on its rearward face and a forward portion shaped to produce low pressure effects adjacent its rearward face when said rotor is operated within a liquid bath at speeds in excess of 2,000 revolutions per minute and causing pressure effects within said chamber and outlet passageways as well as suction effects within said inlet passageway.

8. An apparatus of the character described having in combination a closed fluid chamber having inlet and outlet passageways connected therewith, a hollow rotor unit immersed in a liquid bath in said chamber associated through a differential pressure bearing with said inlet passageway and adapted to receive fluid therefrom on a central axial line thereof, the walls of said chamber being spaced a substantial distance from said rotor unit, said rotor unit having a series of blade members extending circumferentially around the same at spaced intervals each open adjacent its rearward face and each having its forward portion shaped to produce an area of low pressure adjacent its rearward face to cause movement of the fluid through said rotor and blade, and to cause residual pressure in said chamber and cause proportional axial sealing pressure on said bearing and pressure on the fluid within said discharge passageway.

9. An apparatus of the character described having in combination a closed fluid chamber having inlet and outlet passageways connected therewith, a hollow rotor unit immersed in a liquid bath in said chamber associated through a differential pressure bearing with said inlet passageway and adapted to receive fluid therefrom on a central axial line thereof, the walls of said chamber being spaced a substantial distance from said rotor unit, said rotor unit having a series of blade units extending on at least one helical line circumferentially around the same in a direction serving to cause sealing pressure on said bearing, said blades being positioned at spaced intervals each open adjacent its rearward face and each having its forward portion shaped to produce an area of low pressure adjacent its rearward face to cause movement of the fluid through said rotor and blade, and to cause pressure within said discharge passageway.

10. An apparatus of the character described having in combination a closed fluid chamber having inlet and outlet passageways connected therewith, control valves in each of said passageways, a hollow rotor unit immersed in a liquid bath in said chamber associated through a differential pressure bearing with said inlet passageway and adapted to receive fluid therefrom on a central axial line thereof, the walls of said chamber being spaced a substantial distance from said rotor unit at least one blade member mounted on said rotor and projecting slightly above the surface thereof, and having a discharge port on its rearward face and a forward portion shaped to produce low pressure effects adjacent its rearward face when said rotor is operated within a liquid bath at speeds in excess of 2,000 revolutions per minute and causing pressure effects within said chamber and outlet passageways as well as suction effects within said inlet passageway.

11. An apparatus of the character described having in combination a closed chamber adapted to receive a liquid and reduce the free rotation thereof, a rotor shaft extending transversely thereof at a substantially central position, said shaft comprising a driving section and a freely removable rotor section interlockingly engaged for rotation as a single unit and at least one blade in communication with a hollow area in said rotor section, said rotor unit immersed in a liquid bath and spaced from the walls of the chamber a substantial distance, fluid-sealing means for supporting said driving section, and a fluid supply member in pressure differential fluid-sealed relation in communication with the hollow interior of said rotor section.

12. An apparatus of the character described having in combination a closed chamber adapted to receive a liquid and reduce the free rotation thereof, a rotor shaft extending transversely thereof at a substantially central position, said shaft comprising a driving section and a freely removable rotor section interlockingly engaged for rotation as a single unit and at least one blade in communication with a hollow area in said rotor section, said rotor unit immersed in a liquid bath and spaced from the walls of the chamber a substantial distance, fluid-sealing means for supporting said driving section, and a fluid supply member in pressure differential fluid-sealed relation in communication with the hollow interior of said rotor section and supplying a bearing through engagement with said hollow rotor section.

13. An apparatus of the character described having in combination a closed chamber shaped to limit the rotation of fluid therein, a rotor shaft extending transversely thereof at a substantially central position, said shaft comprising a driving section and a freely removable rotor section interlockingly engaged for rotation as a single unit and at least one blade in communication with a hollow area in said rotor section, said rotor unit immersed in a liquid bath and spaced from the walls of the chamber a substantial distance, fluid-sealing means for supporting said driving section mounted on a closure plate for an opening in the side wall of said closed chamber, and a fluid supply member in fluid-sealed relation in communication with the hollow interior of said rotor section.

14. An apparatus of the character described having in combination a closed chamber having a fluid outlet through its upper wall area, a shaft extending transversely through said chamber, a hollow area in said shaft extending substantially across said chamber from one end thereof, pressure-sealed fluid inlet means connected with the hollow area of said shaft, a plurality of blade units provided on a hollow portion of said shaft, said blade units being spaced from the walls of the chamber a substantial distance, and removable plates provided with packing glands supporting said shaft and adapted to be secured in fluid-sealed relation to the opposite walls of said chamber.

15. An apparatus of the character described having in combination a closed chamber having a fluid outlet through its upper wall area, a shaft extending transversely through said chamber, a hollow area in said shaft extending substantially across said chamber from one end thereof, fluid inlet means connected with the hollow area, said shaft extending transversely through said chamber on a substantially horizontal line, a plurality of blade units provided on a hollow portion of said shaft, removable plates provided with packing glands supporting said shaft and adapted to be secured in fluid-sealed relation to the opposite walls of said chamber, and a plurality of partitions intermediate the rotor elements of said shaft and connected with the bottom and side walls thereof and spaced from the top of said chamber.

16. An apparatus of the character described having in combination a closed chamber having a fluid outlet through its upper wall area, a shaft extending transversely through said chamber, a hollow area in said shaft extending substantially across said chamber from one end thereof, fluid inlet means connected with the hollow area, said shaft extending transversely through said chamber on a substantially horizontal line, a plurality of rotor units provided on a hollow portion of said shaft, removable plates provided with packing glands supporting said shaft and adapted to be secured in fluid-sealed relation to the opposite walls of said chamber, and a plurality of partitions having enlarged openings around said shaft positioned intermediate the rotor elements of said shaft and connected with the bottom and side walls thereof and spaced from the top of said chamber, and a plurality of bearing plates rotatably engaged with said shaft and adapted to be secured to said respective partitions to close said openings.

17. An apparatus of the character described having in combination a plurality of interchangeable units adapted to be assembled in longitudinal relation to form a pump of predetermined capacity each unit having a pumping chamber and receiving chamber, each with a fluid passageway in its upper wall area, with a rotor shaft having a central hollow area extending horizontally across said chambers, packing glands mounted in the side wall of said receiving chamber and providing bearings for said rotor shaft, a recessed area in the outer wall of said pumping chamber around an opening in alignment with said packing glands, said recessed area adapted to be closed in fluid-tight relation, at least one blade member mounted on said rotor shaft within said pumping chamber and at least one inlet aperture in said rotor shaft within said receiving chamber, a check valve in said rotor shaft intermediate said blade and inlet opening, a socket area formed in one end of said rotor shaft, and a socket engaging extension formed on the other end of said rotor shaft to permit engagement of said rotor shaft with a companion section of like construction.

18. An apparatus of the character described having in combination a plurality of interchangeable units adapted to be assembled in longitudinal relation to form a pump of predetermined capacity each unit having a pumping chamber and receiving chamber, each with a fluid passageway in its upper wall area, with a rotor shaft having a central hollow area extending horizontally across said chambers, packing glands mounted in the side wall of said receiving chamber and providing bearings for said rotor shaft, a recessed area in the outer wall of said pumping chamber around an opening in alignment with said packing glands, said recessed area adapted to be closed in fluid-tight relation, at least one blade member mounted on said rotor shaft within said pumping chamber and at least one inlet aperture in said rotor shaft within said receiving chamber, a check valve in said rotor shaft intermediate said blade and inlet opening, a socket area formed in one end of said rotor shaft, a socket engaging extension formed on the other end of said rotor shaft to permit engagement of said rotor shaft with a companion section of like construction, an inlet manifold connected with the inlet passageways of each receiving chamber, and a discharge manifold connected with the discharge passageways of each pumping chamber.

19. A rotor for fluid pumps comprising a driving section of cylindrical form provided with supporting and driving elements adjacent one end, and with hollow sleeve supporting section adjacent its central and opposite end portions, said hollow area having apertures at predetermined points, and a sleeve section engaged over and secured to said driving section and formed with blade elements at points registering with said apertures in said hollow area of said driving section.

ALBERT O. PRICE.